March 6, 1928. 1,661,387
E. H. REMDE
INDUSTRIAL TRUCK
Filed Dec. 23, 1925 4 Sheets-Sheet 3
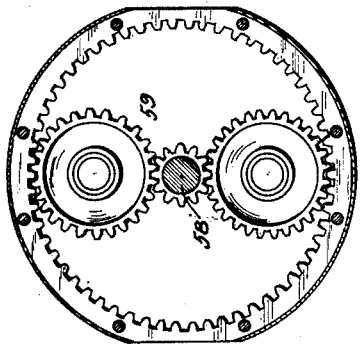
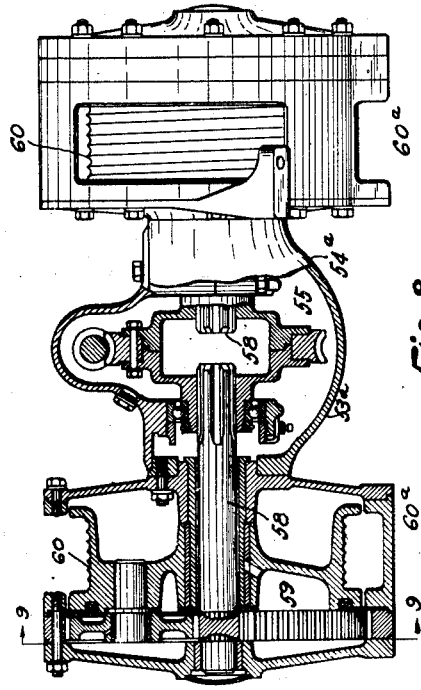
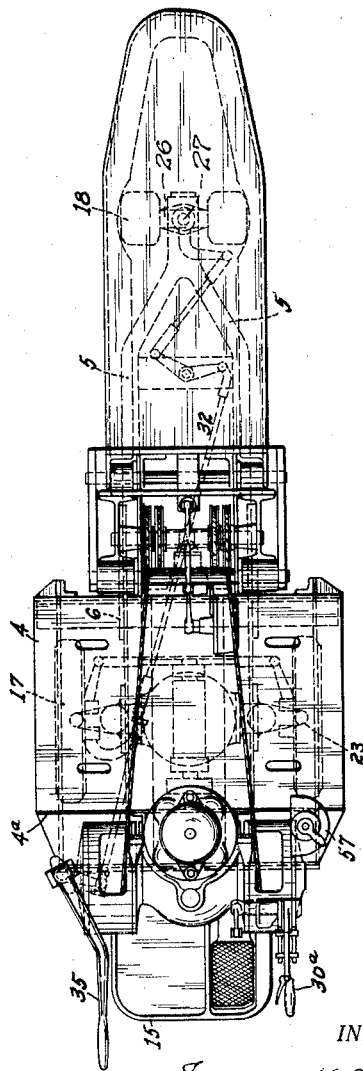
INVENTOR.
Edward H Remde
BY Edward R. Alexander
ATTORNEY.

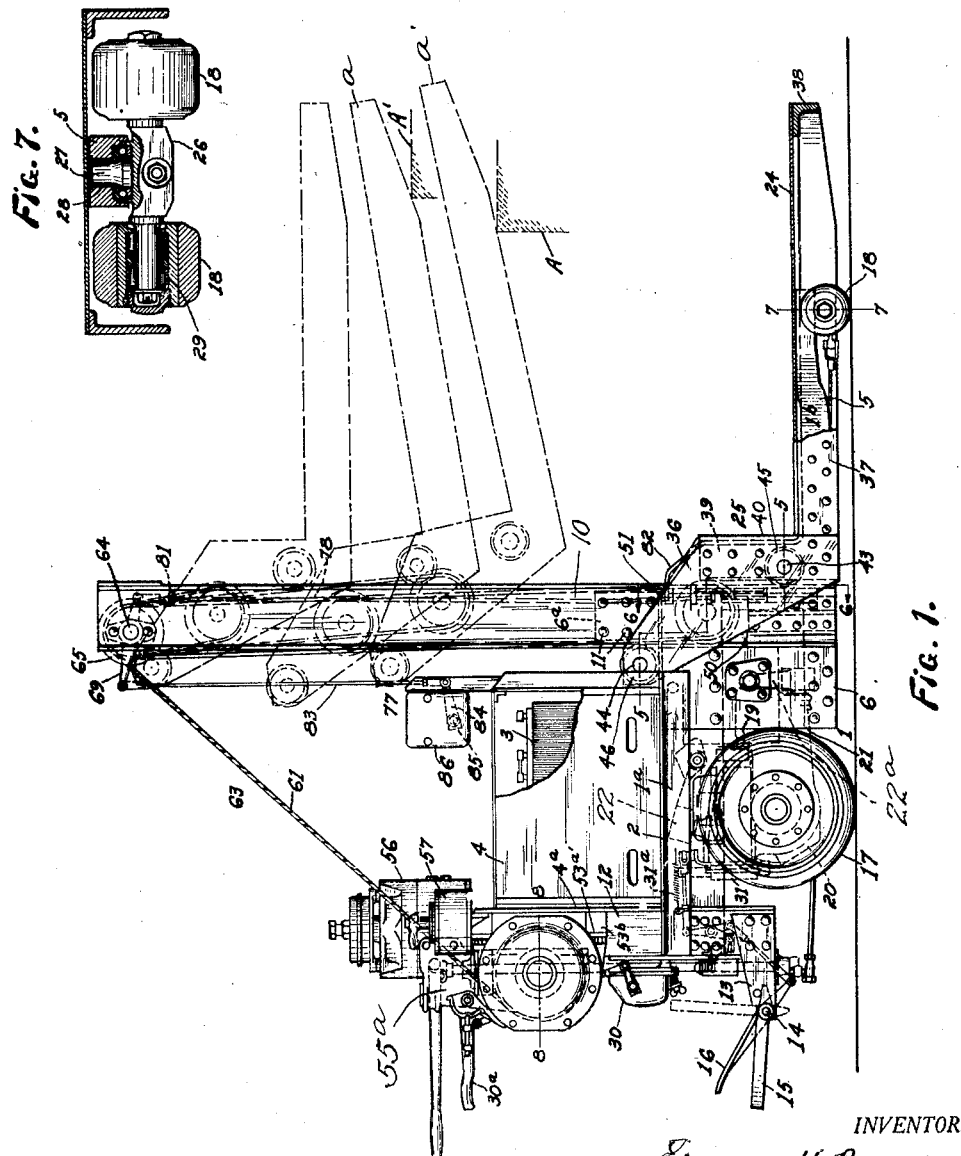

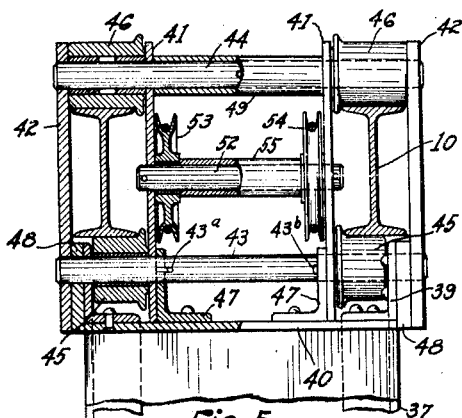

March 6, 1928.
E. H. REMDE
INDUSTRIAL TRUCK
Filed Dec. 23, 1925
1,661,387
4 Sheets-Sheet 4
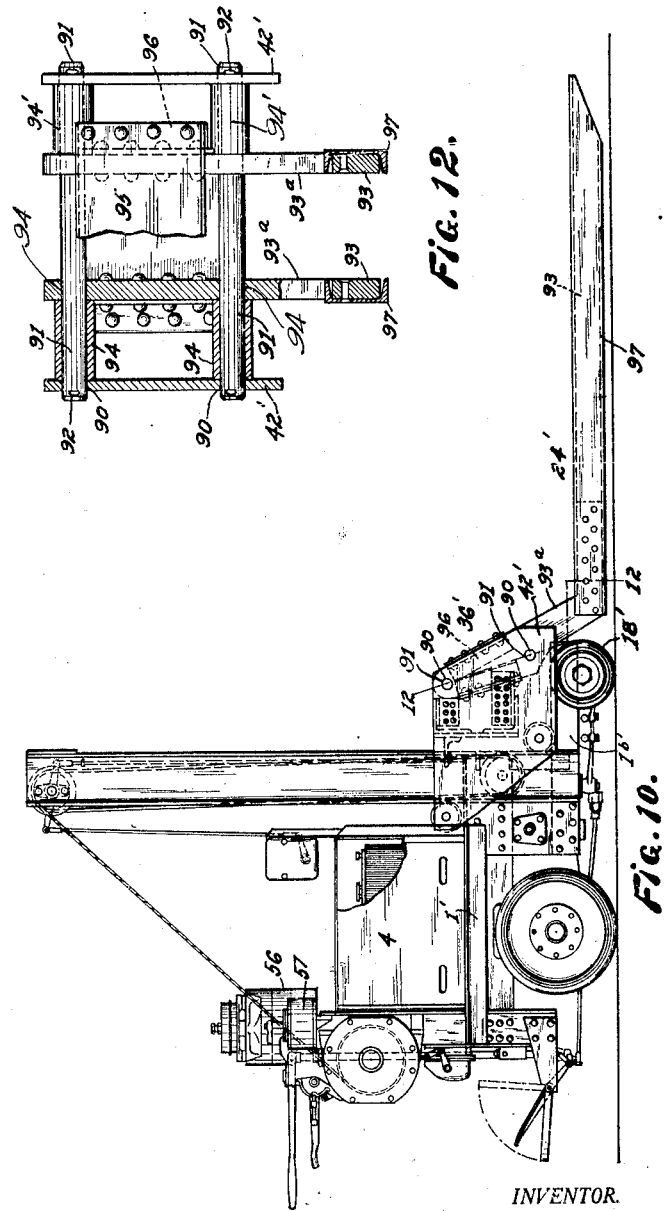

Patented Mar. 6, 1928.

1,661,387

UNITED STATES PATENT OFFICE.

EDWARD H. REMDE, OF CLEVELAND, OHIO, ASSIGNOR TO THE BAKER-RAULANG COMPANY, OF CLEVELAND, OHIO, A CORPORATION OF OHIO.

INDUSTRIAL TRUCK.

Application filed December 23, 1925. Serial No. 77,352.

This invention relates to an industrial truck.

One object of the invention is to provide an improved truck of this character that is relatively simple in construction and cheap to manufacture and assemble.

Another object of the invention is to provide an improved truck of this character in which the elevating member may be operated to raise, lower or support loads with less strains on the guides therefor.

A further object of the invention is to provide an improved truck construction in which the elevating member is capable of movement relative to its guides when meeting an obstruction in its downward movement, whereby damage to these elements is avoided.

Other objects of the invention will be apparent to those skilled in the art to which my invention relates from the following description taken in connection with the accompanying drawings, wherein Fig. 1 is a side view of a truck embodying my invention.

Fig. 2 is an end view looking towards the right of Fig. 1.

Fig. 3 is an end view looking towards the left of Fig. 1, but showing the elevating member raised.

Fig. 4 is a plan view of the truck.

Fig. 5 is a section on the line 5—5 of Fig. 1.

Fig. 6 is a section on the line 6—6 of Fig. 1.

Fig. 7 is a section on the line 7—7 of Fig. 1.

Fig. 8 is a view of the winding mechanism and driving means therefor, partly in section on the line 8—8 of Fig. 1.

Fig. 9 is a section on the line 9—9 of Fig. 8.

Fig. 10 is a side elevation of a truck embodying a slightly modified form of construction.

Fig. 11 is a partial plan view of the parts shown in Fig. 10.

Fig. 12 is a section on the line 12—12 of Figs. 10 and 11.

In the drawings, 1 indicates the frame preferably constructed to form a main or elevated section $1^a$ and a lower or drop section $1^b$. The main section is formed from sections of angle bars arranged longitudinally and transversely and rigidly connected to form a platform 2 for a plurality of batteries 3, preferably enclosed in a casing 4. The drop section $1^b$ comprises a pair of bars 5, having their outer portions disposed in converging relation and their free ends united in a suitable manner, as by welding. The frame sections $1^a$, $1^b$, are rigidly connected together by a pair of spaced plates 6, these plates being riveted along their upper edges to the inner longitudinal angle bars of the frame section $1^a$ and along their lower edges to the inner ends of the bars 5—see Fig. 6. The plates 6 are preferably braced and tied together by a transverse plate 7, angles 8, 8, and 9, 9, being provided to secure the plate 7 to the plates 6 and bars 5.

10 indicates a pair of guides mounted on the frame 1, these guides in the preferred form of construction being mounted in rigid relation to the frame 1 and disposed at the inner ends of the frame sections $1^a$, $1^b$.

The guides 10 may comprise a pair of I-beams, the flanges on their inner sides and along their lower portions being removed so that their webs may be secured in face to face relation with the outer faces of the plates. The guides 10 may be riveted to the plates by the rivets for the angles 8, 9, and rivets 11 engaging arms $6^a$ extending upwardly centrally of the guides 10.

12 indicates uprights disposed adjacent the outer end of the frame section $1^a$ and supporting a dash $4^a$, which preferably forms the front end wall of the casing 4. At their lower ends, the uprights carry a pair of brackets 13, which in turn support the opposite ends of a shaft 14. 15 indicates a platform for the operative swingably mounted on the shaft 14. 16 indicates a brake pedal also mounted on the shaft 14 and associated with the platform for operation by the operative standing thereon.

17, 18, indicate pairs of wheels for supporting the frame 1. The wheels 17 are disposed below the frame section $1^a$ and are driven through a suitable power transmission mechanism by a motor 19. The power transmission mechanism is enclosed in a housing 20 having a cradle 21 to which the motor 19 is connected. The housing 20 and motor 19 are suspended between the axle mechanism for the wheels 17 and frame 1 by a suspension mechanism, elements thereof being shown at 22, $22^a$. This suspension mechanism is not described or claimed herein, since it forms the subject-matter of a separate application filed by John H. Hertner and myself, jointly, on or about October 30, 1920, Ser. No. 420,630 (see Letters Patent 1,628,145). The wheels 17 are mounted on suitable knuckles 23, whereby they may be steered.

The wheels 18 are preferably smaller in size than the wheels 17, so that they may be disposed below and within the sides of a platform 24 forming part of an elevating member (indicated as an entirety at 25), to which reference will later be made. The wheels 18 are mounted on an axle 26 having a shaft 27 mounted in a bearing 28 formed in the connected-together portion of the bars 5 adjacent their free ends. 29 indicates suitable anti-friction bearings for the wheels 18. The construction of each of the wheels 18 being the invention of John H. Hertner and described in a co-pending application filed by him, no claim thereto is made herein. 30 indicates a controller for operating the motor 19. 30ª indicates a handle connected to the controller shaft in any desired manner. 31 indicates a brake mechanism acting on an element driven by the motor 19, being normally operated by a spring 31ª and connected to the pedal 16, whereby it may be released.

32 indicates the steering connections for and between the pairs of wheels 17, 18, whereby they are steered simultaneously these connections being connected to an arm 33 (see Fig. 2) on the lower end of the steering column 34 to which the handle 35 is connected.

The elevating member 25 comprises a shoe section 36 and the platform load carrying and supporting section 24 (already referred to). The platform section 24 consists of a section of angle bar stock bent to form a pair of side sills 37, an end sill 38 and vertical arms 39. The shoe section 36 consists of a vertical plate 40, pairs of inner and outer shoe plates 41, 42, with the plates of each pair disposed parallel to each other and on opposite sides of and in close relation to the adjacent I-beam 10, a pair of parallel shafts 43, 44, extending through and supported in aligned openings in the shoe plates 41, 42, and pairs of flanged rollers 45, 46, supported on the shafts 43, 44, respectively. By preference each of the shafts 43, 44, may be held against rotative movement by a pin 43ª, fitting an opening in one of the shoe plates and against endwise movement by a cotter pin 43ᵇ. As shown in Fig. 5, the plates 41 are secured to the plate 40 by angles 47 and the plate 40 and plates 42 are mounted in fixed relation by being secured to the flanges of the arms 39, spacers 48 being provided between the plates 42 and the adjacent flanges. The flanges of the arms 39, the angles 47 and spacers 48 are extended inwardly beyond the shaft 43 and are formed with openings through which the shaft extends and thus serve to re-inforce the shaft openings formed in the plates 41, 42.

49 indicates a sleeve on the shaft 44 extending between the plates 41 and serving to maintain their free ends in spaced relation and parallel to the plates 42. By preference the rollers 45, 46, are mounted on suitable bushings which at their opposite ends engage with and hence maintain the plates 41, 42, in spaced relation so that danger of the rollers being wedged between these plates is avoided.

In my form of construction the rollers 45, 46, are mounted on parallel shafts and disposed upon the opposite outer sides of the I-beams 10. As a result the strain on the guide beams 10 incident to the weight of the load is carried by relatively broad surfaces and in line with the webs of the beams, so that the full compression strength of the latter resists the load. This arrangement eliminates strain on either guide beam flange, which is liable to break or become distorted where the load is relatively heavy. As will be understood from Fig. 1, the rollers 45 engage the front end flanges of the beams 10 and the rollers 46 engage the rear flanges thereof and the rollers 45 are disposed in a plane below the rollers 46, so that the weight of the platform 24 tends to keep these rollers in engagement with the front and rear flanges while permitting the elevating member to be raised and lowered thereon. While this construction tends to maintain the rollers 45, 46, in rolling engagement with the guides 10, it also permits them or either pair thereof to move away from the guides when the outer portion of the elevating member in its downward movement meets with an obstruction, as will be later set forth. To reduce the amount of material as well as to insure clearances, the plates 41, 42, may be cut off on the inclined lines indicated at 50, 51.

52 indicates a transverse shaft supported at its opposite ends in the plates 41, preferably in a plane midway between vertical planes cutting the axes of the shafts 43, 44, so as to mount the shaft 52 midway between the guide faces formed by the guide beams 10. 53, 54, indicate sheaves loosely mounted on the shaft 52, preferably arranged closely adjacent to the plates 41. 55 indicates a sleeve loose on the shaft 52 and serving to space the sheaves apart, the ends of the sleeve co-acting with the plates 41 to maintain the sheaves in this position. The purpose of the sheaves will later appear. The shaft 52 is preferably held in position by a pair of cotter pins.

53ª indicates a casting forming a housing 54ª for a power transmitting mechanism 55 and a cradle 55ª for a motor 56 (preferably of the electric type and connected with the batteries 3 by means of a controller 57). The casting 53ª is provided with feet 53ª' secured to angle plates 53ᵇ mounted on the uprights 12—see Fig. 1. The power transmitting mechanism 55 is connected to shaft sections 58 (see Fig. 8), each of which in turn is connected to a reduction gearing, indicated as an entirety at 59, to drive a drum 60, in one direction or the other according to the direction of rotation of the motor shaft. As will be understood the shaft sections 58 are driven together in either direction and hence rotate the drums 60 to wind flexible sections 61, 62, (such as cables) thereon or therefrom. As the power transmitting mechanism and reduction gearing are fully illustrated and described and claimed in a co-pending application, further description thereof herein will not be necessary. The drums 60 are partially enclosed in casings 60ª, supported by the casting 53'.

64 indicates a shaft mounted at the upper ends of the guides 10, preferably mounted at its opposite ends in openings formed in the webs of the I-beams.

65, 65ª, 66, 66ª, indicate pairs of sheaves each loosely mounted on the shaft 64, each pair being spaced from the adjacent web by a collar 67 and from each other by a pair of sleeves 68 and the hub of a lever 69 to which reference will later be made. The section 61 of the flexible member 63 leads from one drum 60 over and around the sheave 65, then down and around the sheave 53; from this latter sheave it leads up and around the sheave 65ª and then down to a rotative equalizing element 70. The section 62 of the flexible member 63 leads from the other drum 60 over and around the sheave 66, then down and around the sheave 54; from this latter sheave it leads up and around the sheave 66ª and then down to the equalizing element 70. As shown, the cable sections terminate at and are connected to the equalizing element 70. For this purpose the opposite sides of the equalizing element 70 are formed with grooves concentric to its axis to receive the flexible sections and its body portion is formed with openings into which the free ends of the flexible sections 61, 62, are fitted and removably secured, as shown in Fig. 6.

From the foregoing description it will be understood that (1) when the drums 60 are rotated to wind the flexible sections thereon the elevating member 25 is hoisted or elevated along the guides 10; and (2) when the drums are driven in the opposite direction the elevating member moves downwardly.

71 indicates as an entirety a take up mechanism serving to take up slack in the flexible hoisting sections 61, 62, if for any reason the movement of the elevating member downwardly is arrested or slowed down. The take up mechanism preferably comprises a weighted member 72, supporting the stud-shaft 73 on which the equalizing element 70 is rotatively mounted. The weighted member 72 is slidably mounted between the plate 7 and the walls of a yoke 74, having its feet 75 riveted to the plate 7. At its lower end the member 72 is extended laterally to form projections 76 which engage the lower edge of the yoke 74 to limit the upward movement of the member 72 due to the pull on the flexible sections 61, 62, in supporting or operating the elevating member 25, but if slack occurs in these sections, the member 72 will gravitate downwardly and thus take up the slack without danger of the flexible sections jumping any of the sheaves or getting dislocated on their winding drums.

77 indicates a limiting mechanism operable when the elevating member 25 reaches a predetermined position in moving in either direction to cut off the current to the motor 56. Of the limiting mechanism 77, 78 indicates a rod supported at its upper end by one arm of the lever 69 and guided by the walls of an opening 79 formed in a bracket 80. The bracket 80 is carried by the upper end of the weighted member 72—see Fig. 6. 81 indicate tappets adjustably fixed to the rod 78 and disposed in the path of movement of an arm 82 supported by the plate 40 and extending upwardly and inwardly therefrom—see Fig. 1. If the elevating member 25 is operated in either direction without stopping its motor, the arm 82 will engage a tappet 81 and move the rod 78 endwise. The rod 78 will rock the lever 69 which will move a link 83 connected to the other end of the lever, and the link in turn will operate an arm 84. The arm 84 is connected to a rock shaft 85 mounted in the walls of a casing 86 enclosing pairs of contacts through which current is established to operate the motor 56. One contact of each pair is movable and arranged to be operated by an element fixed to the rock shaft 85 within the casing, so that when the rod 78 is operated as above described, the circuit for the motor 56 is opened.

87 indicates a spring interposed between one side of the bracket 80 and the adjacent tappet 81. 88 indicates a spring interposed between the other side of the bracket 80 and a head 89. As will be understood from Figs. 3 and 6, the springs 87, 88, acting on the tappet 81 and head 89, normally tend to maintain the rod 78 and the elements connected to and actuated by it in normal position. If the rod 78 is moved by reason of the engagement of the arm 82 with either tappet, due to movement of the elevating member in one direction, one or the other of these springs will be put under tension, the effect of which will be to return the rod to its normal position upon movement of the elevating member in the opposite direction. The springs 87, 88, are associated with a port of the weighted member 72, in this instance the bracket 80, so that the same means may be utilized to cut off the current to the motor 56 upon the operation of the take up mechanism 71. Accordingly, it will be seen that if the weighted member 72 gravitates, the bracket 80 will operate through the spring 88 and head 89 to move the rod 78 downwardly and thus open the circuit through one of the pairs of contacts in the casing 86. The switch and the limiting mechanisms form the subjects-matter of separate co-pending applications filed by me and the take-up mechanism and its association with a limiting mechanism form the subject matter of a co-pending application filed by A. G. Hutzley, for which reasons no claim is made herein to these parts and mechanisms.

When an obstruction such as indicated at A or A', becomes positioned below the outer end of the platform and the latter is moved downwardly, the outer end of the elevating member 25 will be arrested while its inner end will continue moving downwardly until the motor 56 is stopped by the operative, thus assuming an upwardly inclined position with its inner end suspended by the flexible sections from the sheaves 65, 65ᵃ, 66, 66ᵃ, and its outer end resting on the obstruction A or A'. In some instances, the elevating member 25 will assume substantially the position shown in dotted lines at a and in other instances it will assume substantially the position shown in dotted lines a', depending to some extent on the friction between the platform 24 and obstruction A or A' or the length of movement of the inner end of the elevating member 25 before the motor 56 is stopped. It will be noted that by reason of the spaced plates 41, 42, the movement of elevating member to the positions shown readily results since these plates have substantially a sliding engagement with sides edge of the beams 10 and thus guide the elevating member in its movement without danger of it or the guides being damaged. Where the obstruction is near the rear or inner end of the platform, the engagement of the elevating member with the obstruction will arrest the movement of the former, and cause the operation of the take-up mechanism 71, which in turn will open the circuit to the motor 56, but where the obstruction is outwardly of the platform 24, bodily movement of the elevating member on the guides 10 will result, and thus avoid any damage to the elevating member or its guides. When the obstruction A or A' causes the elevating member to move to an abnormal position, such as shown in Fig. 1, it may be moved back to normal position by operating the motor 56 to elevate it to a position above the obstruction, during which operation it will assume its normal relation to and in engagement with the guides 10.

Referring to Fig. 10, I have shown a truck embodying my invention but in which the platform or load carrying section is detachably mounted on the shoe section. In this form of construction, the drop section 1ᵇ' of the frame 1' is relatively short, so that the load carrying section 24' may extend to a position outwardly of the supporting wheels 18' and the drop section 1ᵇ' and below the latter; also the outer plates 42' of the shoe section 36' are extended outwardly, preferably to or beyond the end of the drop section 1ᵇ". Near their outer ends the plates are formed with upper and lower aligned openings 90 to removably receive and support rods or pins 91 preferably held against endwise movement by cotter pins 92—see Fig. 12. The load carrying section 24' comprises a pair of bars 93 having upwardly bent arms 93ᵃ formed with aligned openings 94 through which the pins 91 extend to removably mount the section 24' on the shoe section 36'. The arms 93ᵃ are held in fixed relation to the plates 42' by spacing sleeves 94' and the arms 93ᵃ are tied in spaced relation to each other by a plate 95 secured to each arm by an angle 96. The bars 93 may be reinforced by channel bars 97. The pins 91 are preferably disposed in an inclined plane and the arms 93ᵃ bent upwardly in a plane to correspond thereto.

By removing the pins 91 it will be understood that the section 24' may be disconnected from the section 36' and a different form of load carrying member substituted dependent upon the nature of the goods or loads to be handled or other conditions involved in connection with the operations to be effected.

To those skilled in the art to which my invention relates many changes in construction and widely differing embodiments and applications of the invention will suggest themselves without departing from its spirit and scope. My disclosures and the description herein are purely illustrative and are not intended to be in any sense limiting.

What I claim is:

1. In apparatus of the class described, the combination of a wheel mounted frame, a guide frame thereon, an elevating member having a pair of shafts for supporting rollers in engagement with the opposite sides of said guide frame, a transverse shaft on the upper portion of said guide frame between the guide surfaces thereof, a transverse shaft on said elevating member in a plane between the guide surfaces of said guide frame sheaves on each of said transverse shafts, a power mechanism on said first mentioned frame, winding means operated by said mechanism, flexible members arranged to wind on and off said winding means at one end and operatively engaging said sheaves, and means for connecting the opposite ends of said flexible members to one of said frames.

2. An apparatus as claimed in claim 1 in which the transverse shaft on said guide frame carries two pairs of sheaves and each flexible member runs around one sheave of a pair, then around one of the sheaves on said elevating member, then around the other sheave of the adjacent pair of sheaves, and the connection of the flexible members with one of said frames is below the shaft carrying the two pairs of sheaves.

3. In apparatus of the class described, the combination of a wheel mounted frame, a pair of guide members thereon, an elevating member having a pair of shoe plates disposed at opposite sides of each guide member and a pair of rollers arranged between each pair of shoe plates and engaging the opposite end walls of said guide members to support the load carrying section of said elevating member in substantially a horizontal position, said rollers being in different horizontal planes and said shoe plates being in close relation to the opposite sides of the guide members to permit bodily swinging movement of said elevating member upwardly relative to said guide members and separation of the rollers therefrom when the outer portion of said elevating member meets an obstruction, and means for raising and lowering said elevating member and serving to support it during its swinging movement.

4. An apparatus as claimed in claim 3 in which the raising and lowering means include reeving elements on said elevating member between the pairs of shoe plates and on the upper portion of and between said guide members.

5. In apparatus of the class described, the combination of a wheel mounted frame, a pair of guide members thereon, an elevating member having a pair of shoe plates disposed at opposite sides of and in close relation to each said guide member, a pair of shafts extending through said pairs of shoe plates and supporting a pair of rollers between each pair thereof in engagement with the opposite end walls of said guide members and means for raising and lowering said elevating member.

6. An apparatus as claimed in claim 5 in which the raising and lowering means include a pair of flexible members and reeving elements carried by the upper portion of and between said guide members and said elevating member.

7. In apparatus of the class described, the combination of a wheel mounted frame, a pair of guide members thereon, an elevating member having a pair of shoe plates disposed at opposite sides of and in close relation to each said guide member, a pair of shafts extending through said pairs of shoe plates and supporting a pair of rollers between each pair thereof in engagement with the opposite end walls of said guide members, a shaft extending between the inner shoe plates, a shaft carried by the upper portions of said guide members, sheaves on said shafts, flexible members operatively engaging said sheaves, and means for winding up and unwinding said flexible members to raise and lower said elevating member.

8. In apparatus of the class described, the combination of a wheel mounted frame, a pair of guides thereon, a shoe slidably supported on said guides and having a pair of outwardly extending spaced supports formed with pairs of aligned openings, a load supporting member having a pair of arms formed with openings arranged to register with the openings in said supports, and pins removably fitting the openings in said supports and arms to removably mount said load supporting member on said shoe.

9. An apparatus as claimed in claim 8 in which the arms of said load supporting member extend outwardly and downwardly beyond the adjacent end of the frame to support said member in a relative low position.

10. An apparatus as claimed in claim 8 in which the arms of said load supporting member are disposed between said supports and means are provided for spacing the arms therefrom.

In testimony whereof, I have hereunto subscribed my name.

EDWARD H. REMDE.